United States Patent [19]

Egon et al.

[11] Patent Number: 4,708,226

[45] Date of Patent: Nov. 24, 1987

[54] BRAKE LINING, PARTICULARLY FOR A VEHICLE DRUM BRAKE

[75] Inventors: Jánosdeák Egon; Gergely Tibor; Szabó János, all of Budapest, Hungary

[73] Assignee: Autoipari Kutato es Fejleszto Vallalat, Budapest, Hungary

[21] Appl. No.: 24,868

[22] Filed: Mar. 12, 1987

[51] Int. Cl.⁴ .............................................. F16D 69/02
[52] U.S. Cl. ................................................ 188/251 A
[58] Field of Search ................. 188/73.1, 73.2, 251 A, 188/251 M, 251 R; 192/107 M

[56] References Cited

U.S. PATENT DOCUMENTS

T941,012 12/1975 Marzocchi ...................... 188/251 A
2,702,770 2/1955 Steck ............................... 188/251 A
3,526,306 9/1970 Bentz et al. ..................... 188/251 A
4,420,067 12/1983 Yamamoto et al. ............. 188/251 A Primary Examiner—Duane A. Reger
Attorney, Agent, or Firm—Schweitzer & Cornman

[57] ABSTRACT

A brake lining, especially for vehicle drum brakes. The material of the brake lining includes a base in which are embedded oriented reinforcing fibers having a modulus of elasticity larger by at least one order of magnitude than the modulus of elasticity of the material of the brake lining. According to their lengths, at least 60% of the reinforcing fibers in the projection falling onto the plane normal to the axis of rotation enclose an angle alpha in the range between 20° and 70° with the normal of the frictional surface and more than 50% falling onto one side of the normal enclose an angle of 90° minus alpha with the frictional motion vector.

3 Claims, 7 Drawing Figures

BRAKE LINING, PARTICULARLY FOR A VEHICLE DRUM BRAKE

BACKGROUND OF THE INVENTION

The invention relates to a brake lining and lined brake shoe for brake drums, in particular for brake drums of vehicles. The brake lining of the invention has advantageous heat conductivity properties due to its inner structural design and, accordingly, a longer useful life. Use of the present invention can result in avoidance of brake squeal and noises.

Aspects of ecology necessitate reduction of braking noises of vehicles, in particular elimination of brake squeal. At the same time, we are confronted with the problem of the insufficient useful life of brake linings. In particular, for heavy vehicles the main problem lies in that in comparison to the other structural elements the useful life of the brake linings is three times shorter. The linings are quickly worn and exchange is costly. Simultaneously, due to the disadvantageous heat conductivity of the brake linings, operational conditions of the connected structural elements, mainly of the brake drum, are negatively influenced, resulting in frequent repairs and exchange.

Known solutions have been either trifly effective or required structural modifications which could be realized only by the way of new solutions.

Known solutions and proposals, respectively, have attempted to reduce the phenomenon of brake squeal along two lines. In one approach, brake drums are designed so as not tending to vibration. The tendency toward vibration is reduced by rings or coils with a high inner damping pressed onto the outer surface of the brake drum. Or, linings exerting a damping effect are arranged in the channel formed in the flanged of the brake drum. The other approach has involved attempting to reduce brake squeal by an expedient formation of the brake shoe and the brake lining.

According to a known solution, brake linings of different hardness or made of different materials are used on the same brake or shoe, respectively or on the individual brake shoes within the same brake construction.

A brake lining is also known, which has different moduli of elasticity along the generatrix of the friction surface. That is, the extent of deformation is different under the influence of compressive force, since along the generatrix the thickness of the brake lining is different or the thickness is constant and inserts with a modulus of elasticity differing from the modulus of elasticity of the brake lining are embedded. These solutions require a more costly technological process, which is different from the presently used production technology of brake linings. Accordingly, their use with vehicles cannot be considered as economical.

Taking these circumstances into consideration, the object of our invention is to eliminate brake squeal occurring in the drum brakes of heavy vehicles without changing the shape and size of the brake lining and to increase possibly the very short useful life of the presently used brake linings.

It has been attempted to solve the aforementioned problem by the proper formation of the inner structure of the brake lining and in such a manner that the brake lining could be produced by applying the presently used technological methods or methods approximating said methods, simultaneously with low costs of production.

The technological cost-level of the production of brake linings is considerably influenced by the method of positioning of the reinforcing fibers or the fabric itself. In general, the reinforcing fibers with a relatively short fiberlength used to be admixed—in an irregular orientation—with the mass from which brake linings are produced, either individually in an arched finished form or in a band, by pressing, baking or rolling. Although irregular orientation of the fibers cannot be considered as advantageous, it represents the most simple technology. Brake linings with regular fiber orientation were also proposed. Decades ago it was recognized that in the course of wear of the brake lining, fibers which get their full length onto the frictioning surface are torn out from the lining in a short time, so that their reinforcing and heat conducting roles cannot be fulfilled.

In order to avoid this phenomenon it was proposed to prearrange and gather up the reinforcing fibers in such a manner that after having filled the space in between with the lining-mass, the fibers or at least the majority thereof lie perpendicularly to the frictional surface of the finished brake-lining. Fiber orientation of this character can be achieved with a fabric lining too, if the fibers lying normal to the frictional surface are stronger, and thicker than the cross fibers holding the normal fibers.

In another known solution, the web is arranged essentially parallel to the frictional surface, and the fibers are intercrossed at an acute angle. In this case, fibers are not torn out in longer pieces when they get onto the frictional surface. Fibers of different materials, mixed with each other or forming a web function differently in the material of the brake lining. With respect to temperature, asbestos fibers reduce the decrease in mechanical strength and admixed metal fibers also increase mechanical strength and perform the function of heat conductor within the brake linings. Earlier, mechanical strength had been increased by different inserts, e.g., by inserting a perforated sheet which was arranged parallel with the frictional surface.

In spite of these solutions aimed at the elimination of brake squeal or at a defined lining or fiber orientation brake squeal could not be eliminated with heavy vehicles.

SUMMARY OF THE INVENTION

In contrast to the results obtained with prior art solutions, by using the brake lining according to our invention brake squeal can be reduced or fully eliminated. The invention is based on the recognition that the stiffness of the brake lining asserting itself in response to the compressive force and the stiffness against frictional shearing forces affecting the frictional surfaces can be made independent of each other by increasing the latter one, and that simultaneously dependence on temperature can be well influenced. This object can be achieved by using reinforcing elements in the lining material and by the special orientation thereof. In the event that the reinforcing elements are good heat conductors, heat conductivity normal to the frictional surface of the brake lining can be also increased.

Accordingly, our invention relates to a brake and lined brake shoe, in particular primary (leading) and secondary (trailing) brake shoes for drum brakes of vehicles, which have a frictional surface matching the surface of rotation of the brake drum and a supporting surface on the opposite side for fixing to a carrying member wherein in the material of the frictional brake lining a base consisting of oriented fibers and/or reinforcing elements are embedded in a filament-rod-like formation, the modulus of elasticity of the materials the reinforcing fibers and/or rod-like elements are made of, is larger by at least one order of magnitude than the modulus of elasticity of the material of the brake lining. and according to their length at least 60% of the reinforcing fibers and/or rod-like elements in the projection falling onto the plane normal to the axis of rotation of the frictional surface enclose an acute angle in the range between 20° and 70° ($\alpha$) with the normal of the frictional surface, and more than 50% falling onto one side of the normal on said plane enclosing an angle of $90° - \alpha$ with the frictional motion vector.

In a preferred embodiment of the invention, fibers of the base material and/or reinforcing elements are made of diverse materials within one brake lining, formed of continuous or discontinuous fibers which are united expediently into a woven or glued fabric and which are arranged in the brake lining in several layers perpendicular to the axis of the frictional surface. Alternatively, they form a lining consisting of several webs made of different materials having been folded in a waveline or sawtooth-like and are arranged in one or more layers lying above one another in the brake lining, such that the orientation of the folded sections corresponds to the conditions defined in claim 1.

By the orientation of the fibers of the base material and/or the reinforcing elements the stiffness of the brake lining asserting itself in response to the compressive forces and the frictional shearing force can be made independent. While this latter stiffness can be considerably increased compared to the stiffness of the brake lining and as the modulus of elasticity of the reinforcing elements is higher at least by one order of magnitude, dependence on temperature is less than that of the brake lining material, and the temperature dependence of the entire brake lining can be positively influenced.

In the event that we are able to achieve independent stiffness against compressive forces and stiffness against frictional shearing forces affecting the frictional surface of the brake lining, within certain limits, it becomes possible to produce the brake lining according to our invention. The inventive brake lining deforms under the influence of the compressive forces, and is able to bear up against the whole frictional surface on the inner surface of the brake drum having been deformed under load. Simultaneously, it should show considerable stiffness against arising shearing forces characterized by a possibly less elastic deformation. The changing shearing stresses arising under the influence of changing deformation result in the generation of brake squeal causing longitudinal and connected bending vibrations in the brake drum.

Said vibrations cause a considerable radiation of airborne sound manifesting itself in brake squeal. Earlier mentioned vibrations of the brake lining result in fluctuation of the relative slip velocity (v) between the brake lining and the brake drum and of the shearing stress ($\tau$). As a consequence, on the brake drum extremely large longitudinal oscillations will arise if the frequencies $f_s$ of the brake lining coincide with the eigenfrequency $f_d$ of the brake drum.

By considerably increasing the value of the modulus of slip elasticity G of the brake lining material and by the considerable decrease of dependence on temperature, brake squeals can be efficiently reduced or even fully eliminated. In this case eigenfrequencies of the brake lining are shifted to the ultrasonic range in the whole range of operative temperature. Previously, the advantageous effect of the increased G value could prevail practically only to a certain limit since geometric inaccuracies of the brake construction resulted in a higher fluctuation of local pressure value, p, of bearing and simultaneously of breaking moment, the higher the E (modulus of elasticity) of the brake lining. The value of E changes proportionally—as it is well known—with the value G. Such local pressure fluctuations involve unequal temperature distribution and shortened useful life of the brake lining.

Accordingly, reduction of brake squeal and prolongation of usefult time require the application of non-isotropic materials, for which close correlation between values G and E -characteristics for homogeneous and isotropic materials- does not prevail.

BRIEF DESCRIPTION OF THE DRAWINGS

The invention will be described in detail by means of some preferred embodiments serving as examples, by the aid of the drawings enclosed, wherein.

DETAILED DESCRIPTION OF THE INVENTION

Figure 1:
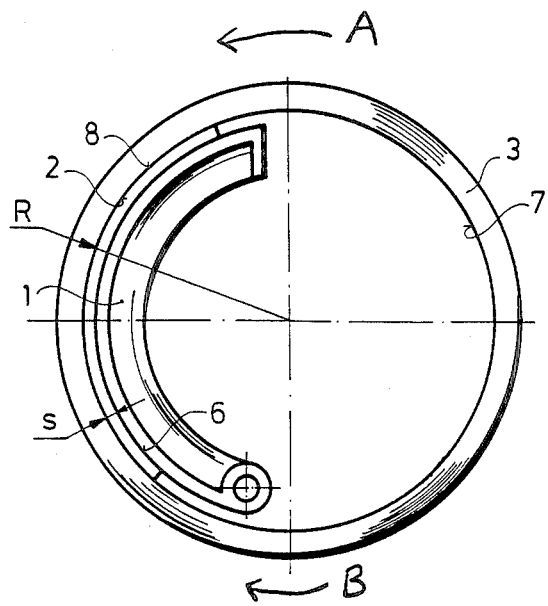
FIG. 1 is a symbolic illustration of the brake shoe provided with the brake lining fitted to the brake drum.

FIG. 1 shows the brake shoe 1 of the drum brake provided with the brake lining 2 in the brake drum 3. The brake lining 2 is matched with its outer cylindrical frictional surface 8 to the inner cylindrical surface with R radius of the brake drum 3. The brake lining 2 is fixed by gluing to the brake shoe 1 forming the carrying member. Thus, the inner cylindrical bearing surface 6, parallel to the frictional surface 8, is glued on.

At a rotational direction A the brake shoe 1 is a primary (leading) one; at a rotational direction B the brake shoe 1 is a secondary (trailing) one.

Figure 2:
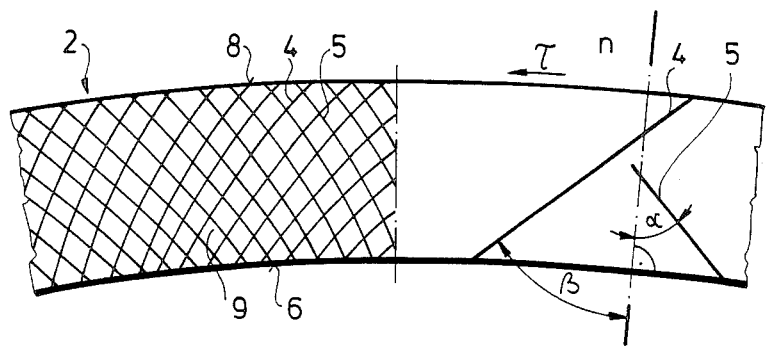
FIG. 2 illustrates the arrangement of the reinforcing elements in the brake lining according to the invention, using geometric markings.

FIG. 2 shows the first embodiment of the brake lining 2. The left part of the figure shows the arrangement of the multitude of the reinforcing elements in a projection lying normal to the axis of rotation, while the right part shows a reinforcing element in the same projection together with the needed indications. Reinforcing elements 6 are formed by reinforcing fibers 4 and 5 made of copper alloy. Reinforcing fibers 5 enclose an angle $\alpha = 60°$ with the normal n of the frictional surface 8 of the brake lining 2 in their projection falling onto the plane normal to the axis of the frictional surface 8. Reinforcing fibers 4 enclose an angle $\beta = 60°$ with the normal n of the frictional surface 8 of the brake lining 2 in their projections falling onto the plane normal to the axis of the frictional surface 8 and in such a manner that the reinforcing fibers 4 and 5 enclose an angle of $\alpha + \beta = 120°$ with each other.

In the brake lining material 9 embedding the reinforcing fibers 4 and 5, reinforcing fibers 4 form about the half of all the embedded reinforcing fibers—enclosing an angle $\beta$ with the normal n—, while reinforcing fibers 5 form the remaining half, enclosing angle $\alpha$ with the normal. A majority of the reinforcing fibers 4, 5 lie in the planes normal to the axis of the frictional surface 8, and they form an approximately logarithmic helical shape, such that they actually enclose an angle α or β, respectively with the normal in the projection not falling exclusively onto the plane. The material 9 of the brake lining is a synthetically based material mixed with fillers, while its modulus of elasticity is lower than the modulus of elasticity of the reinforcing fibers 4 and 5, partly elementary fibers, partly twists consisting of a plurality of elementary fibers.

Compared to known brake linings, the brake lining 2 shows similar stiffness against the compressive forces acting in the direction of the normal n. However, compared to known brake linings, it displays an increased stiffness against the frictional force acting in direction of the tangent of the frictional surface 8, as under the influence of the shearing stresses slip of the equidistant layers of the brake lining 2 was reduced by several orders of magnitude. As a consequence of applying reinforcing fibers 4,5 with a high modulus of elasticity and depending inconsiderably on temperature, the change in the stiffness of the heating brake lining 2 against the frictional forces in dependence of temperature diminishes since reinforcing fibers 4 and 5 form a strong skeleton in the material of the brake lining softening under the influence of temperature rise.

Figure 3:
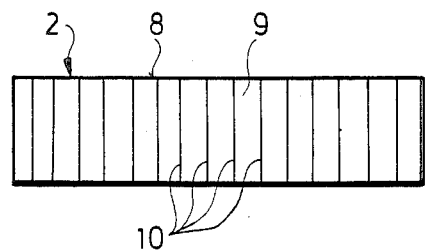
FIGS. 3 through 7 show the single embodiments with differently formed oriented elements.

FIG. 3 shows another embodiment of the brake lining 2, giving a sectional view in the plane being normal to the axis of the frictional surface 8, i.e., in cross-secion. In material 9 of the brake lining the fibers forming the web-sheets 10 are forming the reinforcing elements. Web-sheets 10 are arranged in parallel planes lying normal to the frictional surface 8. The arrangement of FIG. 3 is similar to that of FIG. 2 in that the web-sheets 10 are disposed such that reinforcing fibers 5 enclose an angle $\alpha \cong 60°$ with the normal n of the frictional surface 8 of the brake lining 2 in their projection falling onto the plane normal to the axis of the frictional surface 8. Reinforcing fibers 4 enclose an angle $\beta \cong 60°$ with the normal n of the frictional surface 8 of the brake lining 2 in their projection falling onto the plane normal to the axis of the frictional surface 8 and in such a manner that reinforcing fibers 4 and 5 enclose an angle $\alpha + \beta \cong 120°$ with one another.

Reinforcing fibers 4 form so that about half of all the reinforcing fibers in the material 9 of the brake lining embedding the reinforcing fibers 4 and 5 enclose an angle β with the normal n, while reinforcing fibers 5—forming the remaining half—enclose the angle α with the normal n.

Figure 4:
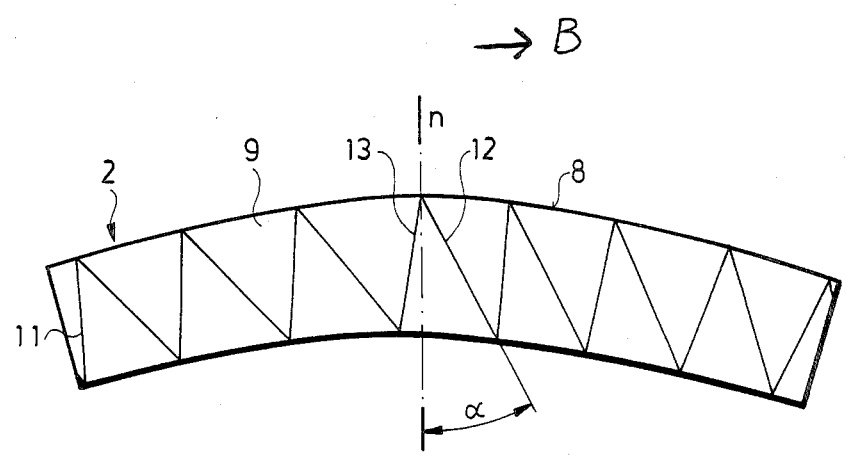

FIG. 4 shows the third embodiment of the brake lining 2 according continuous fiber 11 is folded and lies in the plane normal to said axis of rotation. The part containing the reinforcing fibers 12 encloses an angle $\alpha \cong 50°$ with the normal n of the frictional surface 8, while reinforcing fibers 13 enclose an angle 10° with the normal n. All continuous fibers 11 are folded and positioned and so embedded in the material 9 of the brake lining. Since the part containing the reinforcing fibers 12 is longer than that containing the reinforcing fibers, the orientation of the fibers meets the requirement that more than 60% of the reinforcing fibers enclose an angle in the range between 20° and 70° with the normal n—in the projection normal to the axis of rotation according to length—, since the parts with the reinforcing fibers 12 occupy an angular position of $\alpha \cong 50°$.

Figure 5:
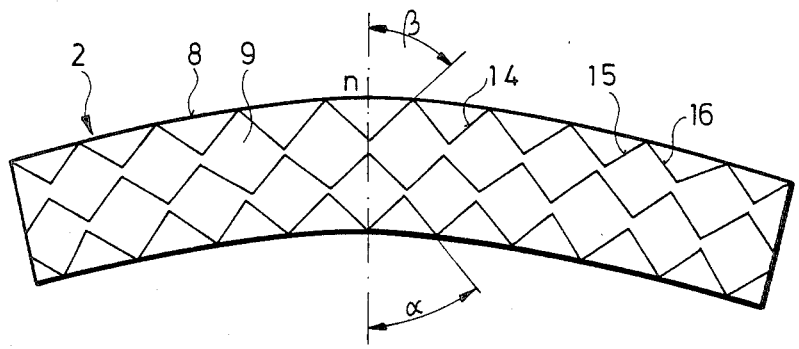

The fourth embodiment of the brake lining according to the invention is to be seen in FIG. 5 in a projection normal to the axis of the frictional surface 8. In the material 9 of the brake lining the fibers forming the folded web-sheets 14 form the reinforcing elements. Warp and weft fibers of the web-sheets 14 are perpendicular to each other, the net having quadratic meshes is folded along the diagonals of the square and is arranged in a folded state in the material 9 of the brake lining. Both foldings 15 and 16 enclose an angle of 45° with the normal of the frictional surface 8, while the foldings 15 and 16 enclose an angle 90° with one another. In the material 9 of the brake lining three web-sheets 14 lie one above another while folding edges of the single sheet-layers are placed on top of each other. In the section lying normal to the axis of the rotation of the frictional surface 8, fibers of the web-sheet 14, i.e., all the reinforcing fibers—enclose an angle $\alpha \cong \beta \cong 45°$ with the normal n.

Instead of the web-sheet 14 a perforated sheet with similar openings can be used.

Figure 6:
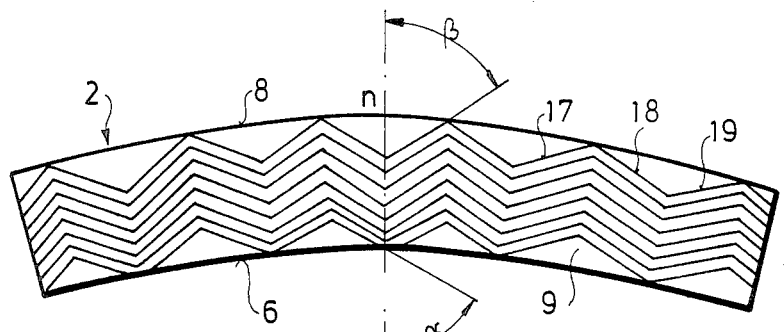

The fifth embodiment of the brake lining 2 according to the invention is seen in FIG. 6 in a projection normal to the axis of the frictional surface 8. In the material 9 of the brake lining mats 17 with randomly oriented fibers form the reinforcing elements. Mats 17 are arranged in a folded state in the material 9 of the brake lining.

Both foldings 18 and 19 enclose an approximately 60° angle with the normal n of the frictional surface 8, while foldings 18 and 19 enclose an angle of 120° with one another. In the material 9 of the brake lining a plurality of mats 17 are lying above one another; said mats are fitted into each other, folding edges are matched and run essentially parallel with the generatrix of the frictional surface 8. In the projection falling onto the plane normal to the frictional surface 8 elementary fibers are unoriented in the mats 17. However, their longitudinal extension is parallel with the plane of the mat-layer. Accordingly, statically they occupy the same position as the foldings 18, 19 which means that reinforcing elements enclose an angle $\alpha \cong \beta \cong 60°$ with the normal n.

Figure 7:
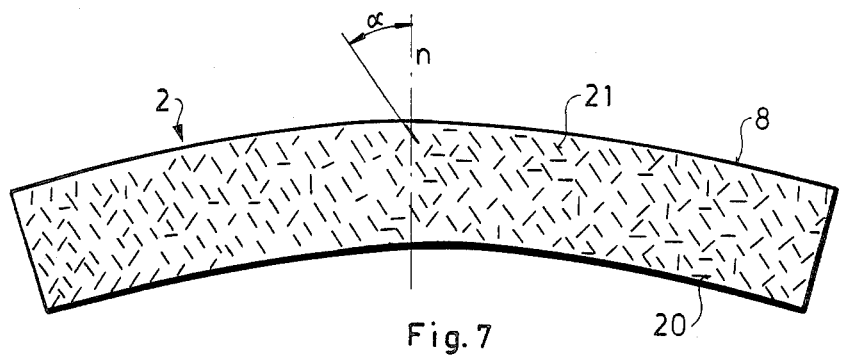

The sixth embodiment of the brake lining 2 according to the invention is seen in FIG. 7 in a projection normal to the axis of the frictional surface 8. In the material 9 of the brake lining reinforcing elementary fibers 20 are embedded in a disordered state. Straight reinforcing fibers 21 with a total length corresponding to the total length of the fibers 20 and having a higher module of elasticity than the fibers 20 are embedded so as to enclose an angle of approximately $\alpha \cong 45°$ with the normal n of the frictional surface 8, fibers 21 are run nearly parallel and normal to the generatrix of the cylindrical frictional surface 8. From this it becomes obvious that more than 60% of the reinforcing elements or fibers enclose an angle of 45° with the normal n in the plane perpendicular to the axis of rotation of the frictional surface 8.

We claim:

1. A brake lining for a drum brake having a surface of rotation, (a) said brake lining having a frictional surface of arcuate contour generally matching the surface of rotation of the brake drum and having a supporting surface on the opposite side for affixation to a carrying member, (b) said brake lining frictional surface having an axis generally coincident with the axis of rotation at said brake drum, (c) the material of the frictional brake lining comprising a plurality of adjacent web sheets including embedded oriented reinforcing elements in a filament-rod-like formation, (d) said reinforcing elements being made of a material having a modulus of elasticity which is larger by at least one order of magnitude than the modulus of elasticity of the material of the brake lining, (e) said web sheets arranged and configured such that the reinforcing elements contained therein are so oriented that the projections of at least 60% of such reinforcing elements falling onto a plane normal to the axis of the frictional surface enclose an acute angle in the range between 20° and 70° with a plane normal to the frictional surface.

2. Brake lining as claimed in claim 1, characterized in that (a) the web sheets are arranged in several layers above each other in the material of the brake lining, and (b) said layers are folded in undulating fashion such that most of the fiber elements in said web sheets are disposed at an angle of from 20° to 70° to the normal to said friction surface.

3. Brake lining as claimed in claim 1, characterized in that (a) the web sheets are arranged in several layers in side-by-side relation to each other in the material of the brake lining, (b) the planes of said web sheets being at right angles to the axis of said friction surface, and (c) most of the fiber elements in said web sheets being disposed within the planes of said web sheets to lie at angles of from 20° to 70° to the normal to said friction surface.

* * * * *

UNITED STATES PATENT AND TRADEMARK OFFICE
CERTIFICATE OF CORRECTION

PATENT NO. : 4,708,226
DATED : Nov. 24, 1987
INVENTOR(S) : Egon Jánosdeák et al.

It is certified that error appears in the above-identified patent and that said Letters Patent are hereby corrected as shown below:

On the title page

Insert in the heading:
--This application is a continuation of application Ser. No. 650,303 filed on September 12, 1984, now abandoned.--

Signed and Sealed this

Sixth Day of December, 1988

Attest:

DONALD J. QUIGG

*Attesting Officer*      *Commissioner of Patents and Trademarks*